United States Patent
Lo

(10) Patent No.: US 6,668,486 B2
(45) Date of Patent: Dec. 30, 2003

(54) BEAN SPROUTS CULTIVATING SYSTEM CAPABLE SPRAYING WATER UNIFORMLY AND ADJUSTING PRESSURES UPON THE BEAN SPROUTS FLEXIBLY

(76) Inventor: Kung-Shen Lo, No. 1-1, Lane 25, Min Chih St., Chung Ho, Taipei Hsien (TW)

(*) Notice: Subject to any disclaimer, the term of this patent is extended or adjusted under 35 U.S.C. 154(b) by 0 days.

(21) Appl. No.: 10/086,461
(22) Filed: Feb. 28, 2002
(65) Prior Publication Data US 2003/0159350 A1 Aug. 28, 2003

(51) Int. Cl.⁷ .............................................. A01G 31/00
(52) U.S. Cl. .................................................... 47/61
(58) Field of Search ................. 47/64, 61, 14

(56) References Cited
U.S. PATENT DOCUMENTS 5,636,474 A * 6/1997 Lo ................................. 47/14

* cited by examiner

Primary Examiner—Charles T. Jordan
Assistant Examiner—Francis T. Palo
(74) Attorney, Agent, or Firm—Pro-Techtor International Services

(57) ABSTRACT

A bean sprout cultivating system capable of spraying water uniformly and adjusting pressure on the bean sprouts using cultivating boxes with upper and lower ends of each conduit having a water inlet and a water dropping opening, respectively. When the water flow of a water source in the water feeding system is larger than the total flow of the conduits at a bottom of the cultivation box, a downward water pressure is generated so that water will flow into the water inlet. The water from the water dropping openings flows into the lower cultivation box uniformly. Then the water flows through the water dispatching holes in the pressure cover to more uniformly cover the bean sprouts in the lattice disk. The surplus water will flow into the lower cultivation box from the water dropping openings of the conduits.

4 Claims, 17 Drawing Sheets

BEAN SPROUTS CULTIVATING SYSTEM CAPABLE SPRAYING WATER UNIFORMLY AND ADJUSTING PRESSURES UPON THE BEAN SPROUTS FLEXIBLY

FIELD OF THE INVENTION

The present invention relates to a bean sprout cultivating system, and particularly to a bean sprout cultivating system capable of spraying water uniformly and adjusting pressure on the bean sprouts.

BACKGROUND OF THE INVENTION

In current bean sprout cultivating systems, water is sprayed on the bean sprouts. To produce high quality bean sprouts and prevent bean sprouts from rotting, various chemicals are used to improve the growth of the bean sprouts. Moreover, manmade polyester is added in the air. However, this way of cultivating bean sprouts very possibly deteriorates the quality of the bean sprouts. Recently, some organic cultivating technologies have been developed. However, these technologies are not completely mature. Many problems still exist, such as complicated multi-layer water supply pipes, expensive control elements, and siphon elements which are difficult to wash. Moreover, additives are needed.

Taiwan Patent No. 167424 "Quick Cultivating Bean Sprouts System and Water Saving System Having a Function of Automatic Level Balance" has been assigned to the Applicant of the present invention. In the referenced disclosure, the prior art bean sprout cultivating system is improved as a three dimensional cultivating system. Thereby, water can be uniformly distributed to every cultivation box. However, the water supply system of this prior art cannot effectively distribute water uniformly, and further, the system is complicated.

SUMMARY OF THE INVENTION

Accordingly, the primary object of the present invention is to provide a bean sprout cultivating system capable of spraying water uniformly and adjusting pressure on the bean sprouts. A bottom of a cultivation box has a plurality of conduits, and upper and lower ends of each conduit have a water inlet and a water dropping opening, respectively. When the water flow of a water source from the water feeding system is larger than the total flow of the conduits at the bottom of the cultivation box, a downward water pressure is generated so that water will flow into the water inlet, and water from the water dropping openings flows into the lower cultivation box uniformly. The water then flows through the water dispatching holes in the pressure cover to more uniformly drop to the bean sprouts in the lattice disk. The surplus water will flow into the lower cultivation box from water dropping openings of the conduits. After water has been supplied, the water inlets installed in the conduits will sustain water at a predetermined level to be absorbed by the roots of the bean sprouts. When water has reached the cultivation box of the lowest layer, the surplus water will drain to the lower water exhausting groove from the water dropping openings of the conduits. The water is drained or reprocessed for further use.

Another object of the present invention is to provide a bean sprout cultivating system wherein the conduit has a water inlet with a predetermined height, and the water inlets of the conduits will retain water which is absorbed by roots of the bean sprouts.

Another object of the present invention is to provide a bean sprout cultivating system wherein in the growth process of the bean sprouts, hooks at the lower sides of the two inner walls of the cultivation box and the retaining seat at the two lateral walls of the position block are provided with an elastic pressure adjusting structure formed by a belt. From initiation to the end of the growth time of the bean sprouts, a gradually increasing elastic pressure coefficient, which is derived from a calculation, is applied. (At initiation, 250 grams of bean seeds under a pressure of 1.5 kg, and at the end, 250 grams of bean seeds under a pressure of 15 kg). Under this gradually increasing pressure, the bean sprouts will release a larger amount of ethylene gas so that the bean sprouts will grow uniformly and rapidly. The longitudinal growth of the cells of the bean sprouts will be effectively suppressed, and the transverse expansion of the cells is increased. Moreover, since the bean sprouts are pressed by a continuously increasing force, a larger amount of ethylene gas metabolizes into ethylene monooxygenase and then converts into ethylene oxide. Ethylene oxide is helpful to suppress the growth and breeding of bacteria. Therefore, a cultivating process using no additives is achieved.

A further object of the present invention is to provide a bean sprout cultivating system wherein in picking the bean sprouts, due to the lattice frame of the lattice disk, the bean sprouts can be cut easily so as to separate them from the root.

The various objects and advantages of the present invention will be more readily understood from the following detailed description when read in conjunction with the appended drawings.

DETAILED DESCRIPTION OF THE PREFERRED EMBODIMENTS

Figure 1:
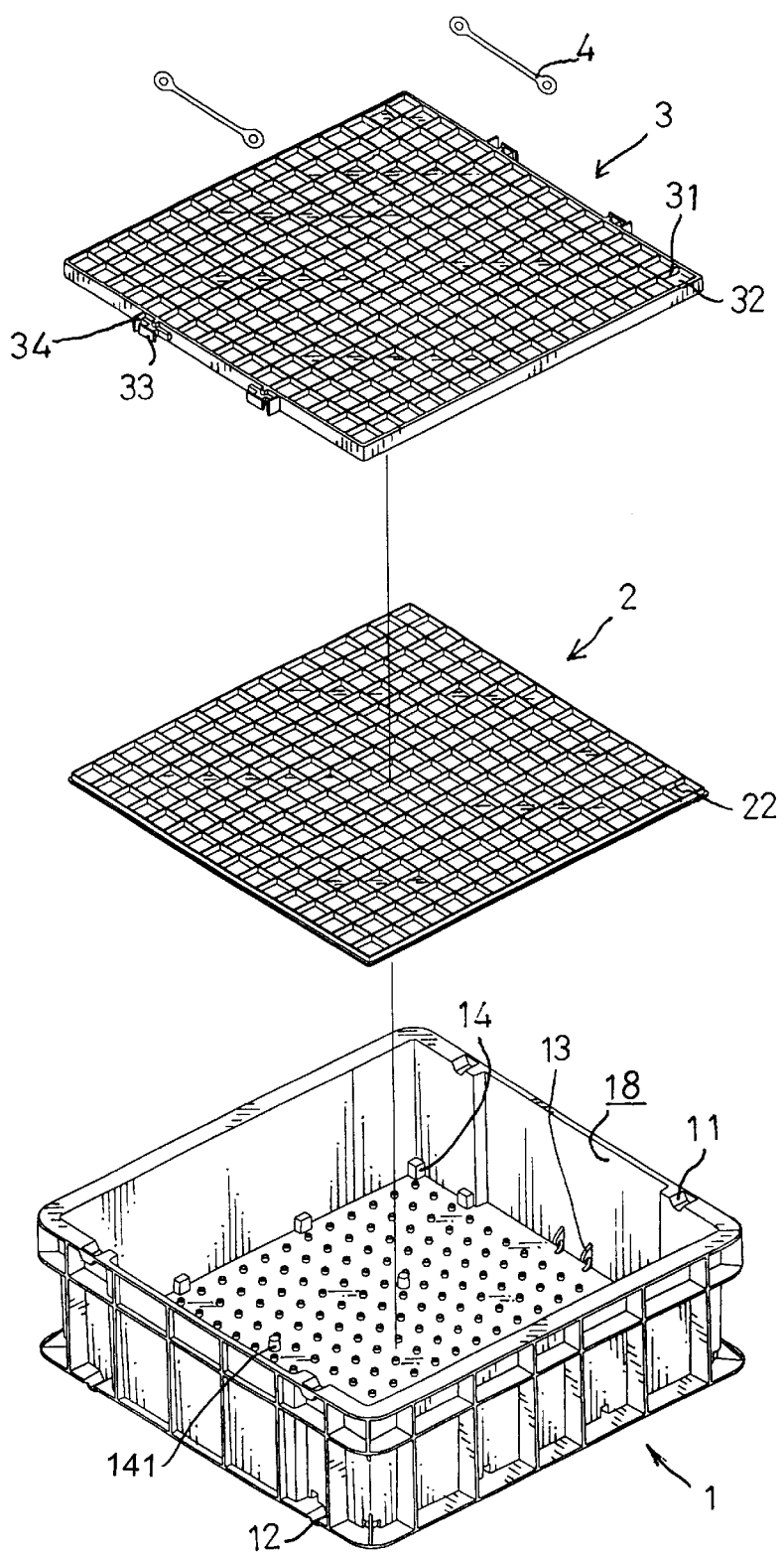
FIG. 1 is an exploded perspective view of the cultivation box of the present invention.
Figure 1A:
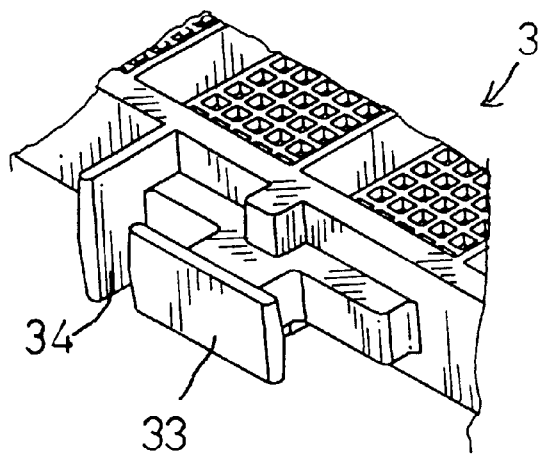
FIG. 1a is an enlarged view of the retaining seat of the pressure cover of the present invention.
Figure 1B:
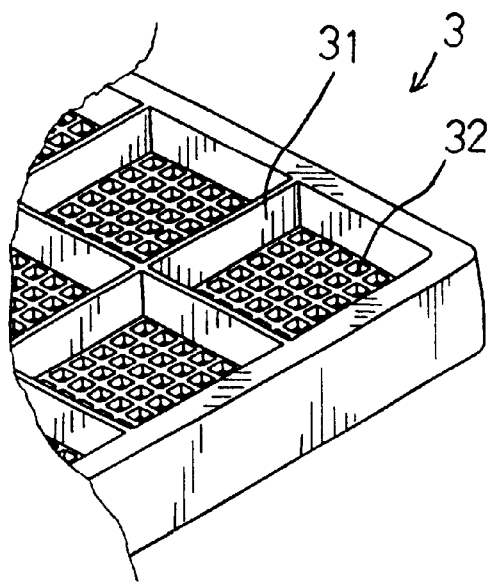
FIG. 1b is a partial enlarged view of the pressure cover of the present invention.
Figure 1C:
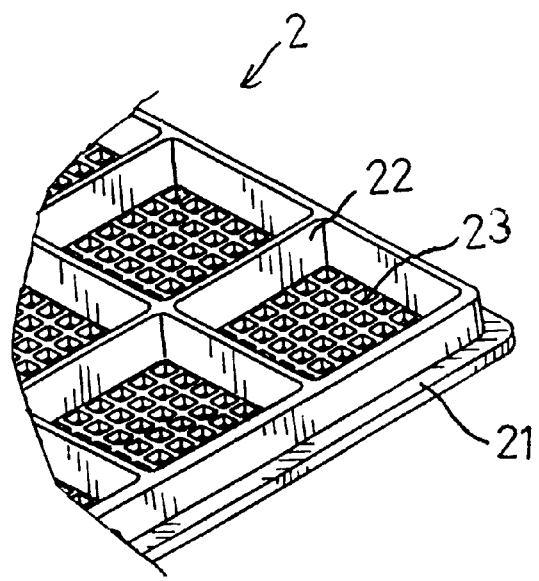
FIG. 1c is a partial enlarged view of the lattice disk of the present invention.
Figure 1D:
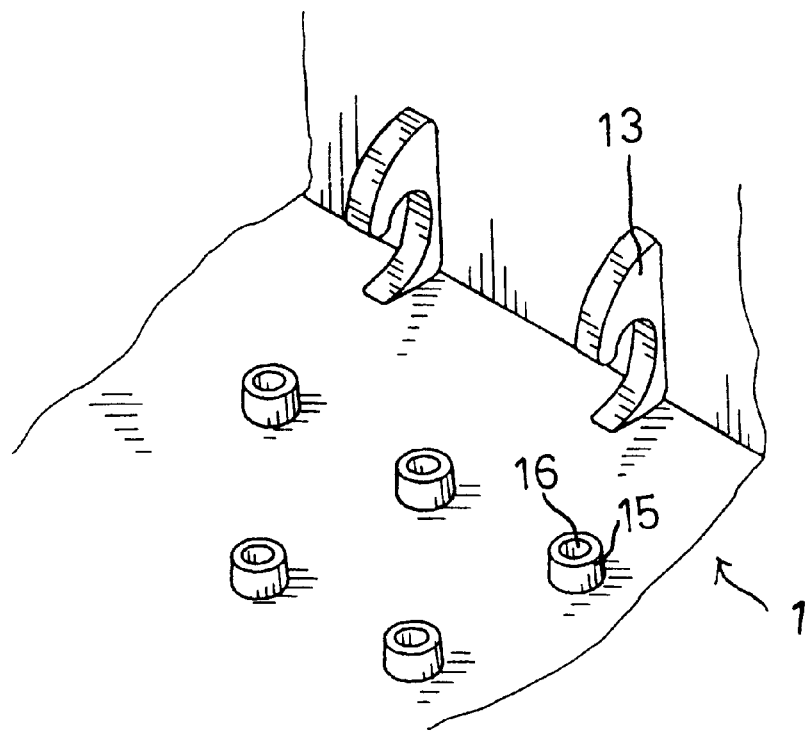
FIG. 1d is a partial enlarged view of the cultivation box of the present invention.
Figure 1E:
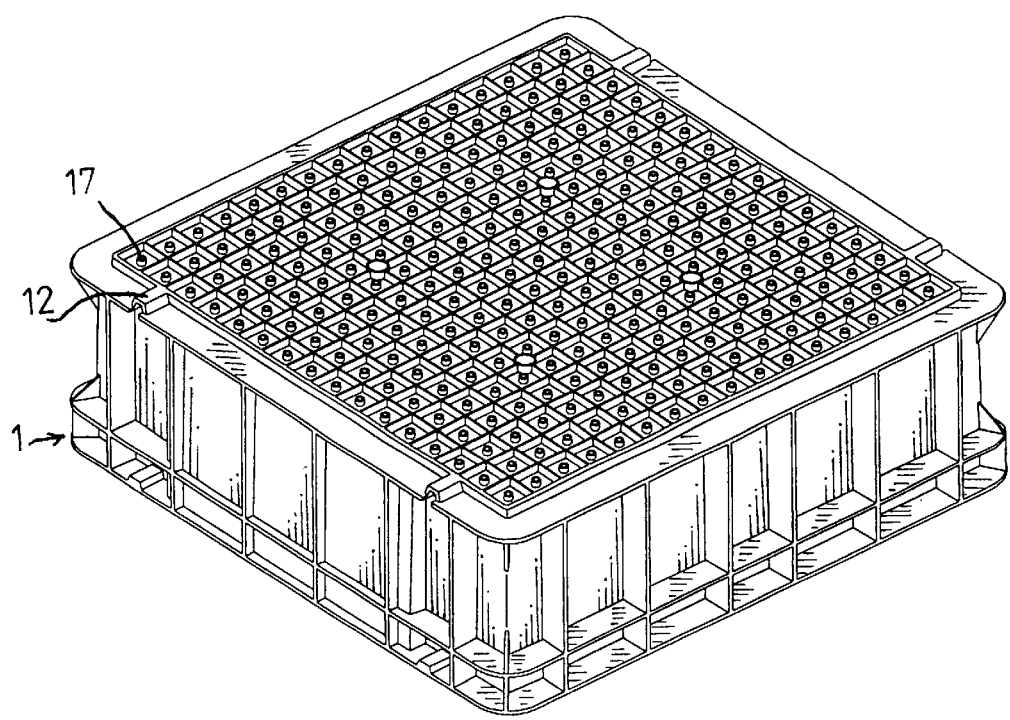
FIG. 1e is a perspective view showing the bottom of the cultivation box of the present invention.
Figure 2:
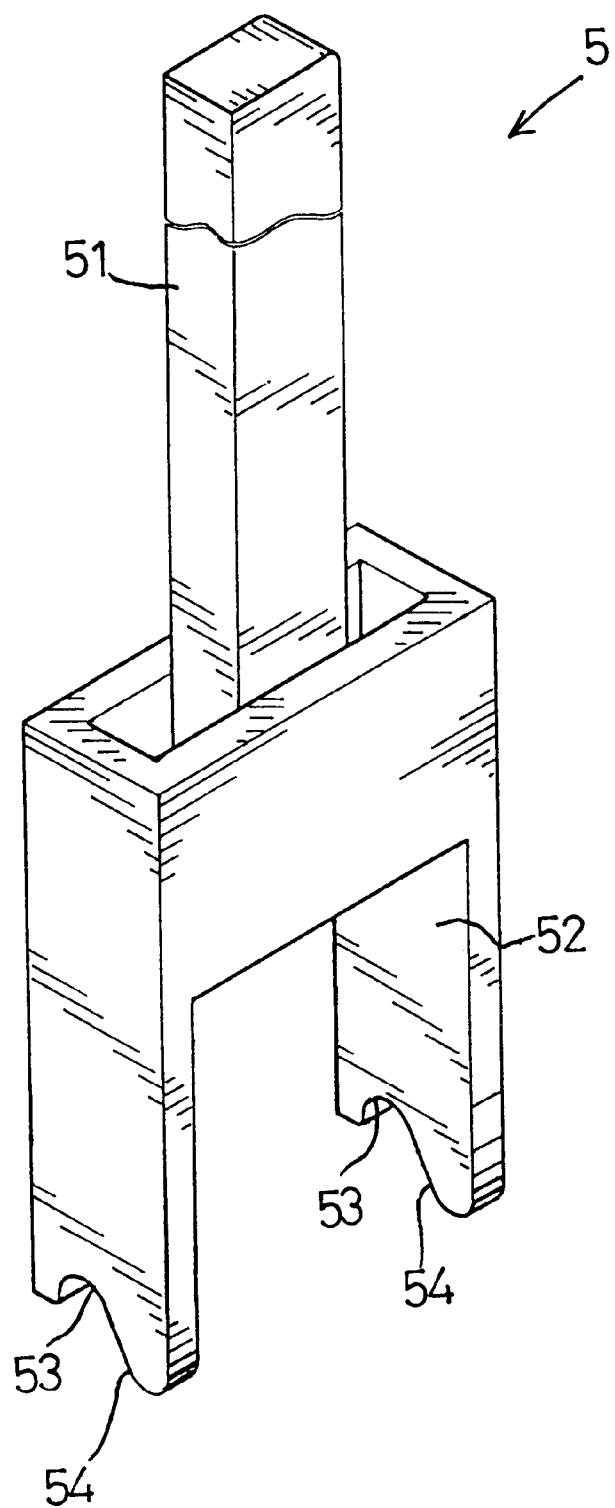
FIG. 2 is a perspective view of the engaging and disengaging means of the present invention.

Referring to FIGS. 1, 1a, 1b, 1c, 1d, 1e, 2 and 4, the present invention comprises the following components:

Cultivation boxes 1 can be stacked one on top of another. The edge of the opening of the box 1 includes a plurality of positioning grooves 11. The lower edge of the box 1 has a plurality of positioning pins 12 that are received in the plurality grooves 11. The lower edge of the interior of the box 1 has a plurality of blocks 14 of equal height. A pair of opposite sides have recesses 18. The lower edge of each recess 18 has two hooks 13 for hooking an elastic belt 4. The bottom of the cultivation box 1 has a plurality of conduits 15. An upper and a lower end of each conduit 15 has a water inlet 16 and a water dropping opening 17, respectively.

A pressure cover 3 is formed by a plurality of ribs 31 which are arranged with equal spaces to form a lattice. The bottom of the lattice has a plurality of water dispatching holes 32 for dispatching water uniformly. The pressure cover 3 has a retaining seat 33 that is secured at a side of the recess 18 for retaining the elastic belts 4 (which may be made of rubber or a spring). The retaining seat 33 has a protecting piece 34.

A lattice disk 2 is provided for bedding bean seeds. The bottom thereof is formed as a flat porous bedding net 21 which is arranged to coincide with the lattice of the pressure cover 3. The height of the lattice frame 22 of the bedding net 21 is the height of the expanding bean seeds 8 to be cultivated. During picking, the bean sprouts 81 are pressed against the lattice frame 22 so that the roots of the bean sprouts 81 can be easily cut. The net holes 23 of the bedding net 21 must be smaller than the bean seeds 8 so as to prevent the bean seeds 8 from falling through. The roots of the bean sprouts 81 pass through the net holes 23 to absorb water.

Figure 3A:
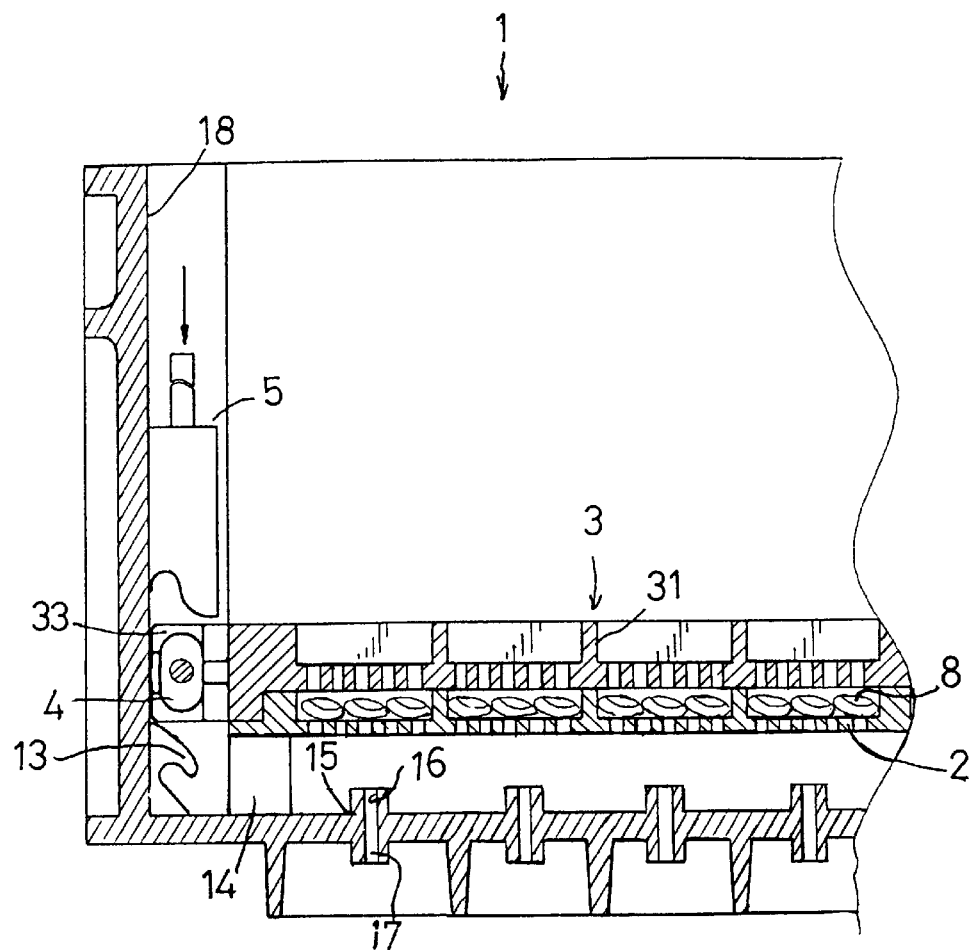
FIGS. 3a and 3b are schematic views showing that the engaging and disengaging means of the present invention buckles the belt to the hooks after the bean seeds are placed in the disk.
Figure 3B:
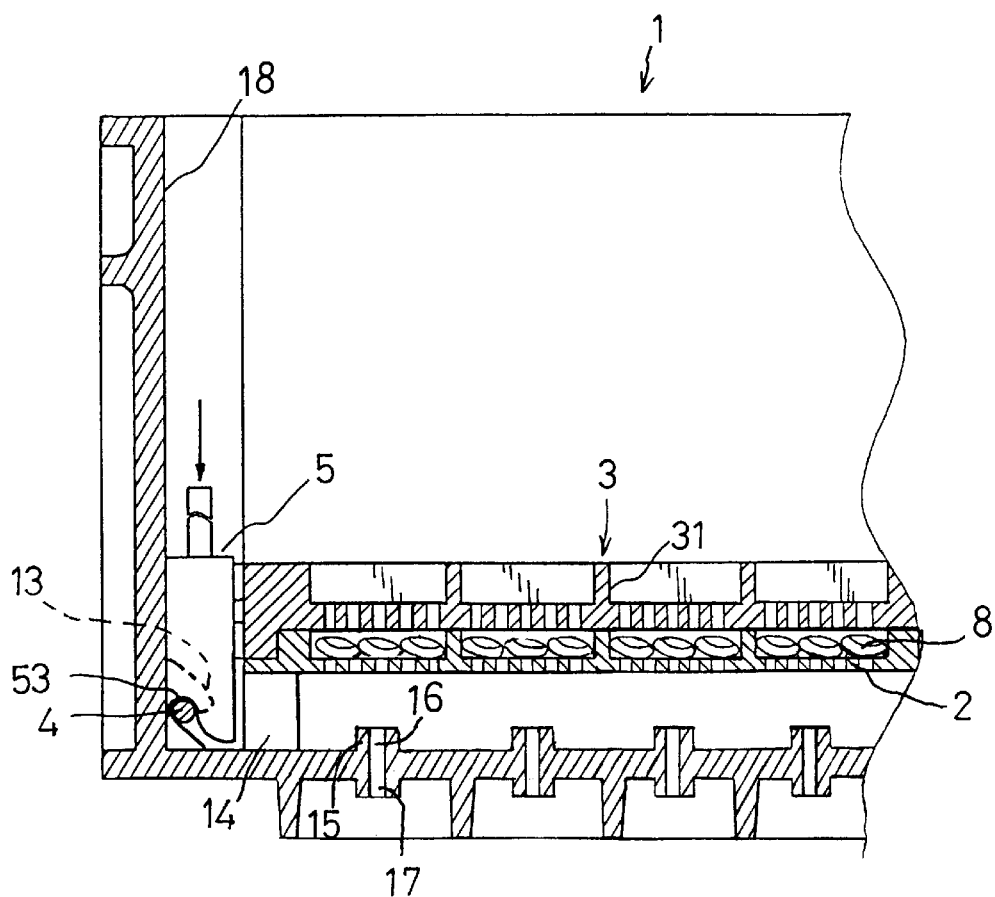
Figure 4:
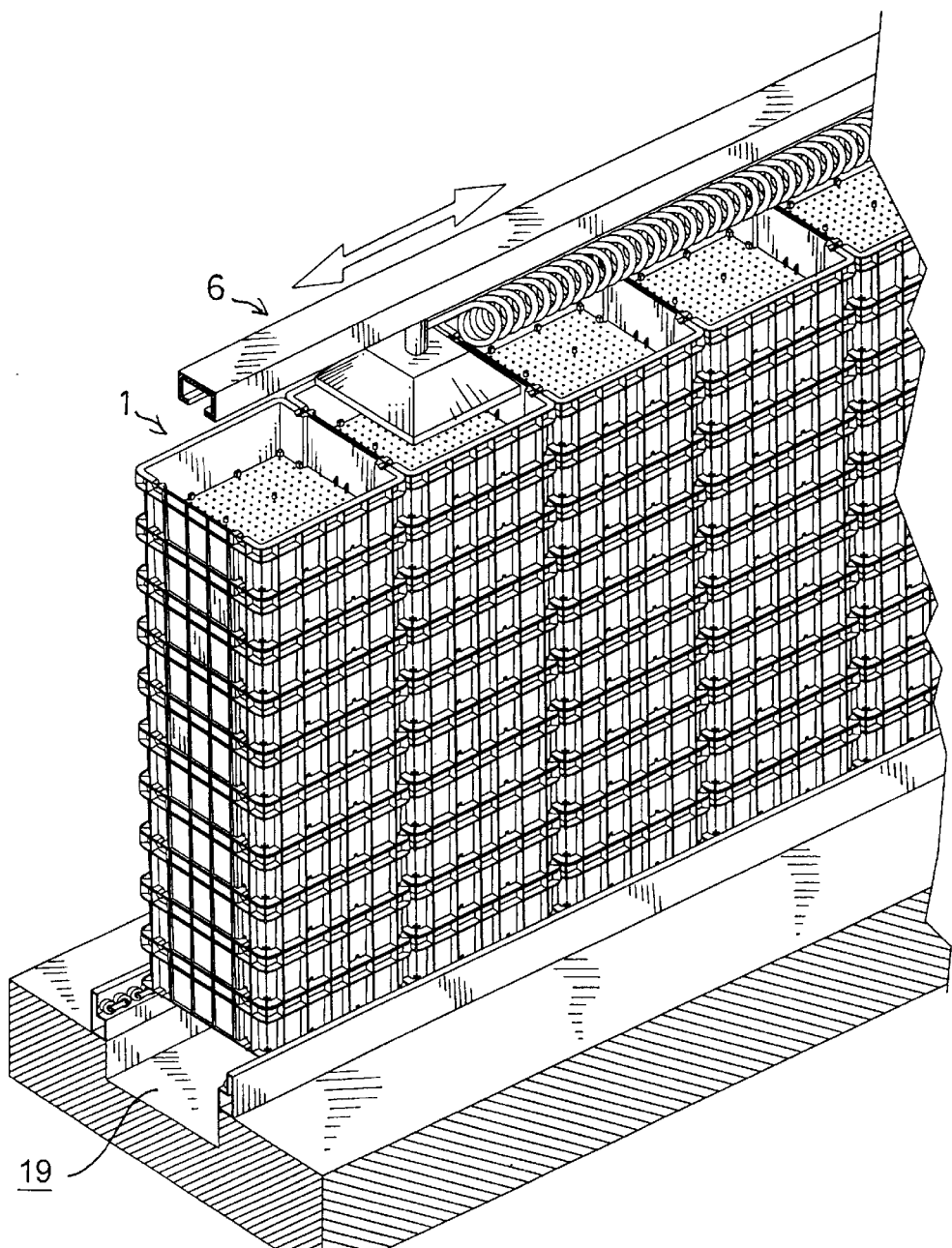
FIG. 4 is a perspective view of the present invention.
Figure 5:
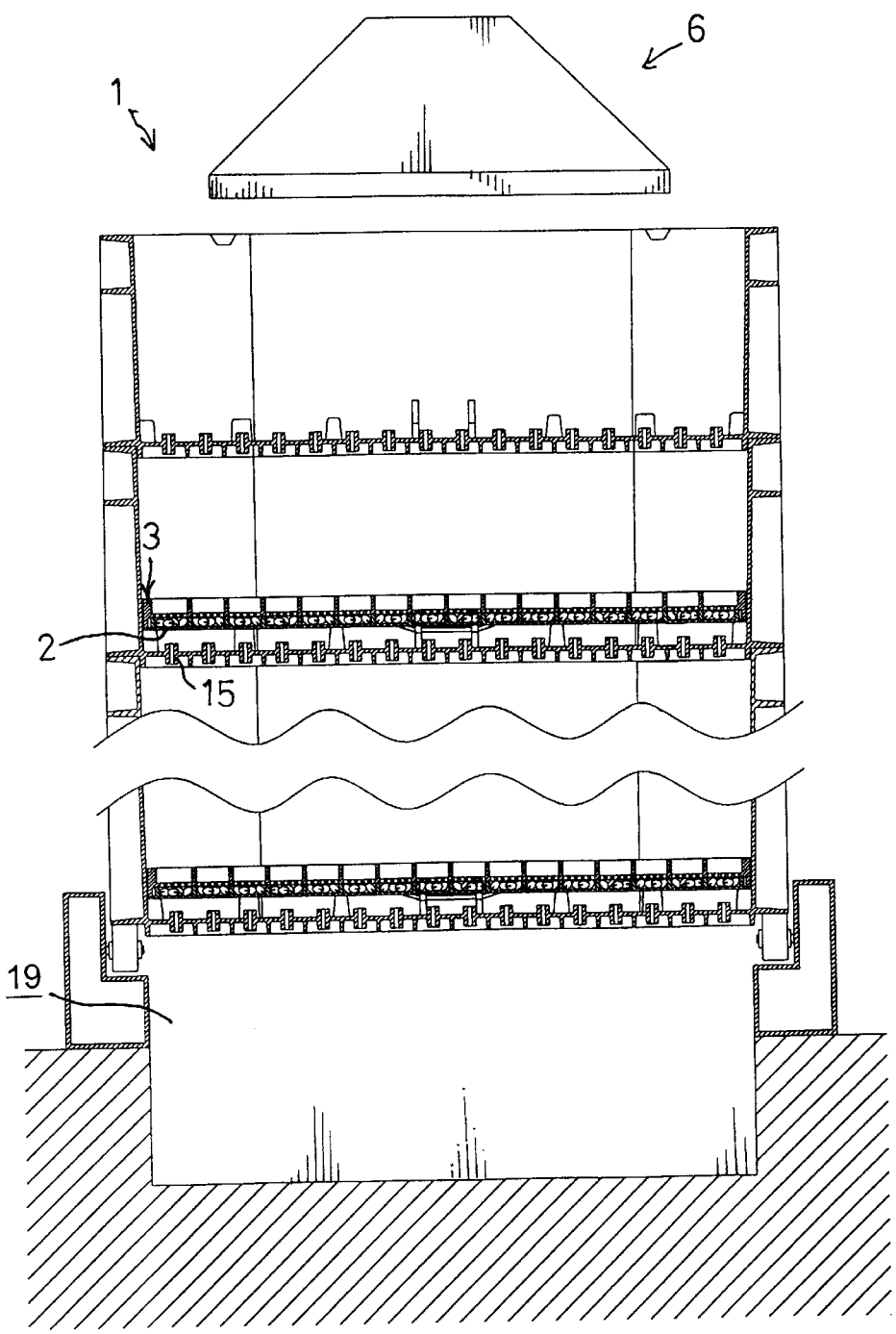
FIG. 5 is a partial schematic view before water is supplied.
Figure 5A:
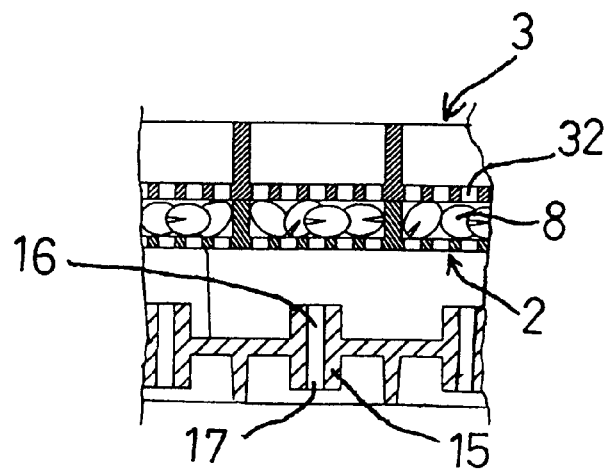
FIG. 5a is a partial enlarged view of FIG. 5.
Figure 6A:
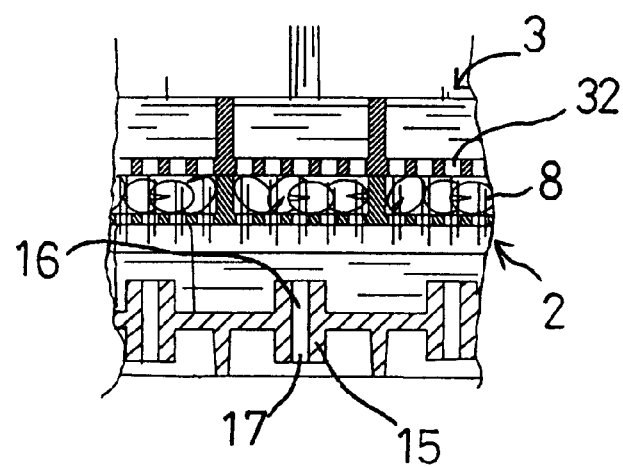
FIG. 6a is a partial enlarged view of FIG. 6.
Figure 6:
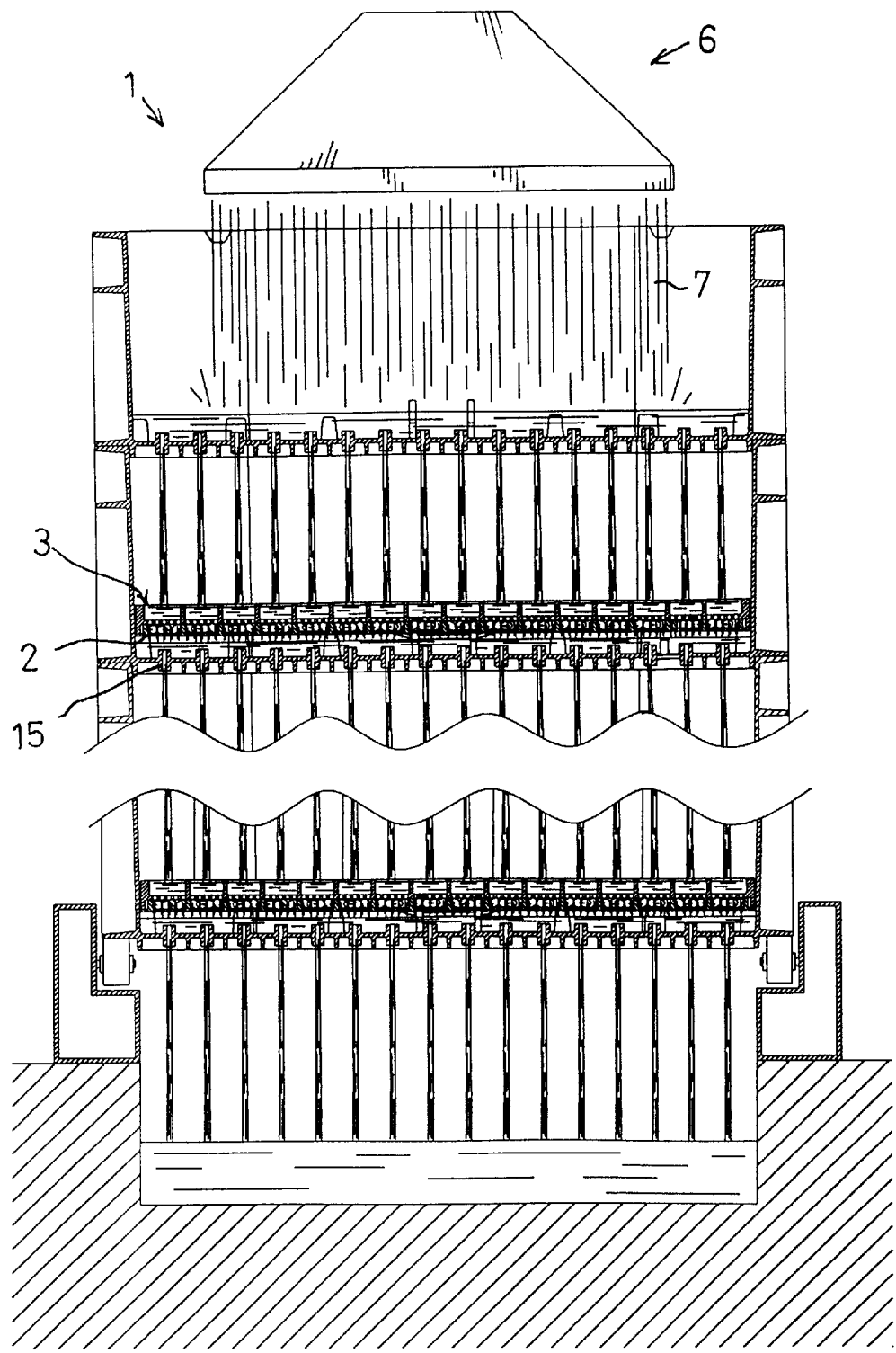
FIG. 6 is a partial schematic view during water application.
Figure 7:
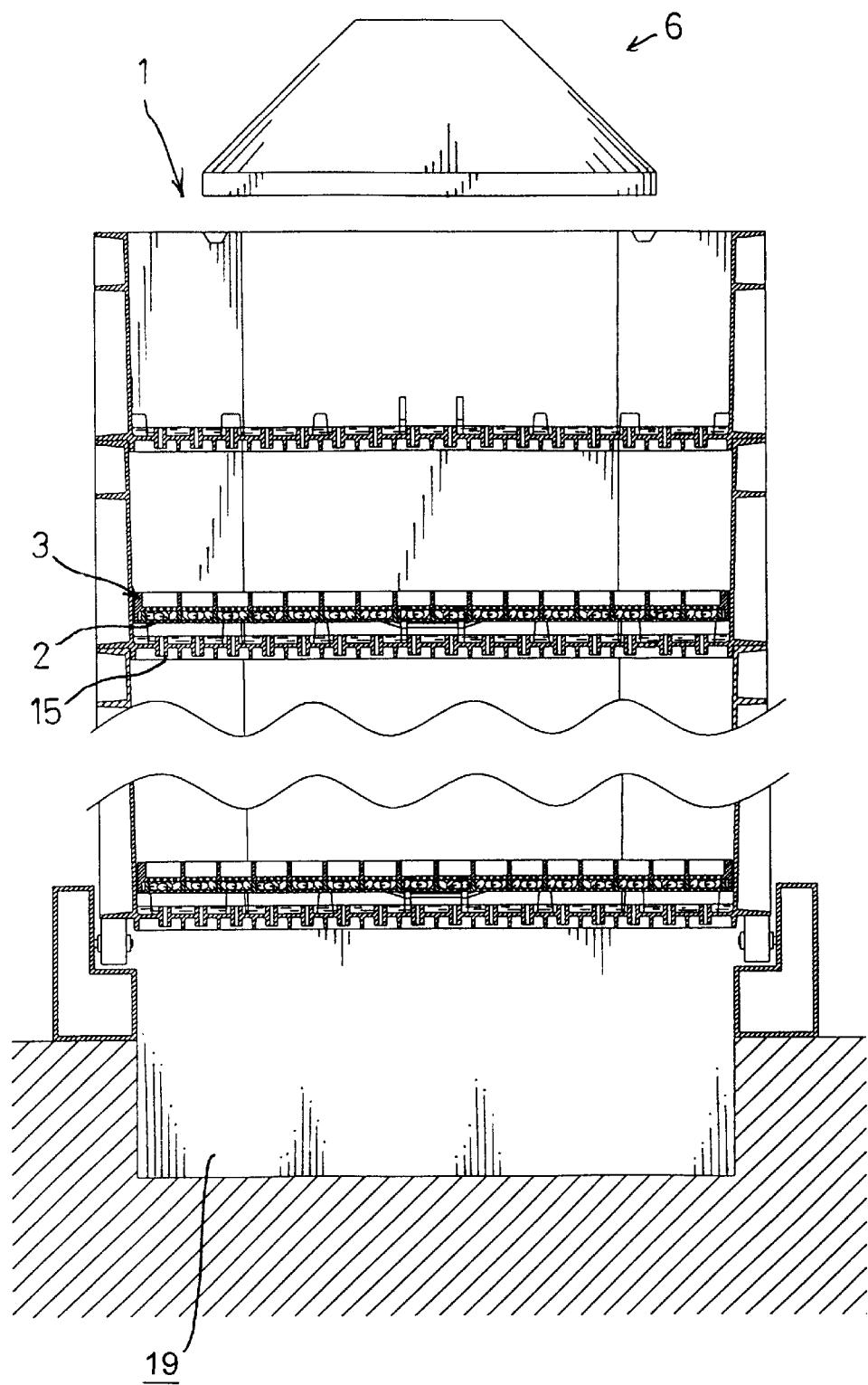
FIG. 7 is a partial schematic view after water has been supplied in the present invention.
Figure 7A:
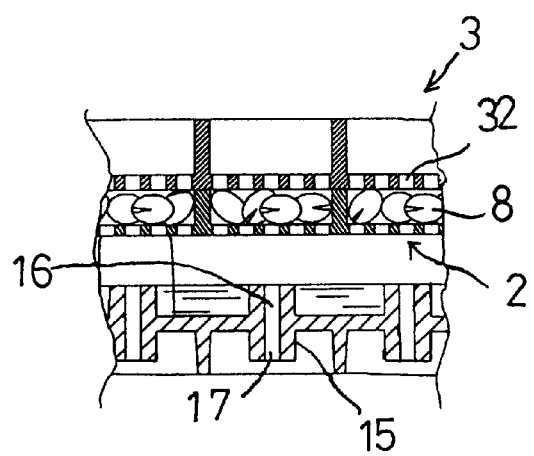
Figure 8:
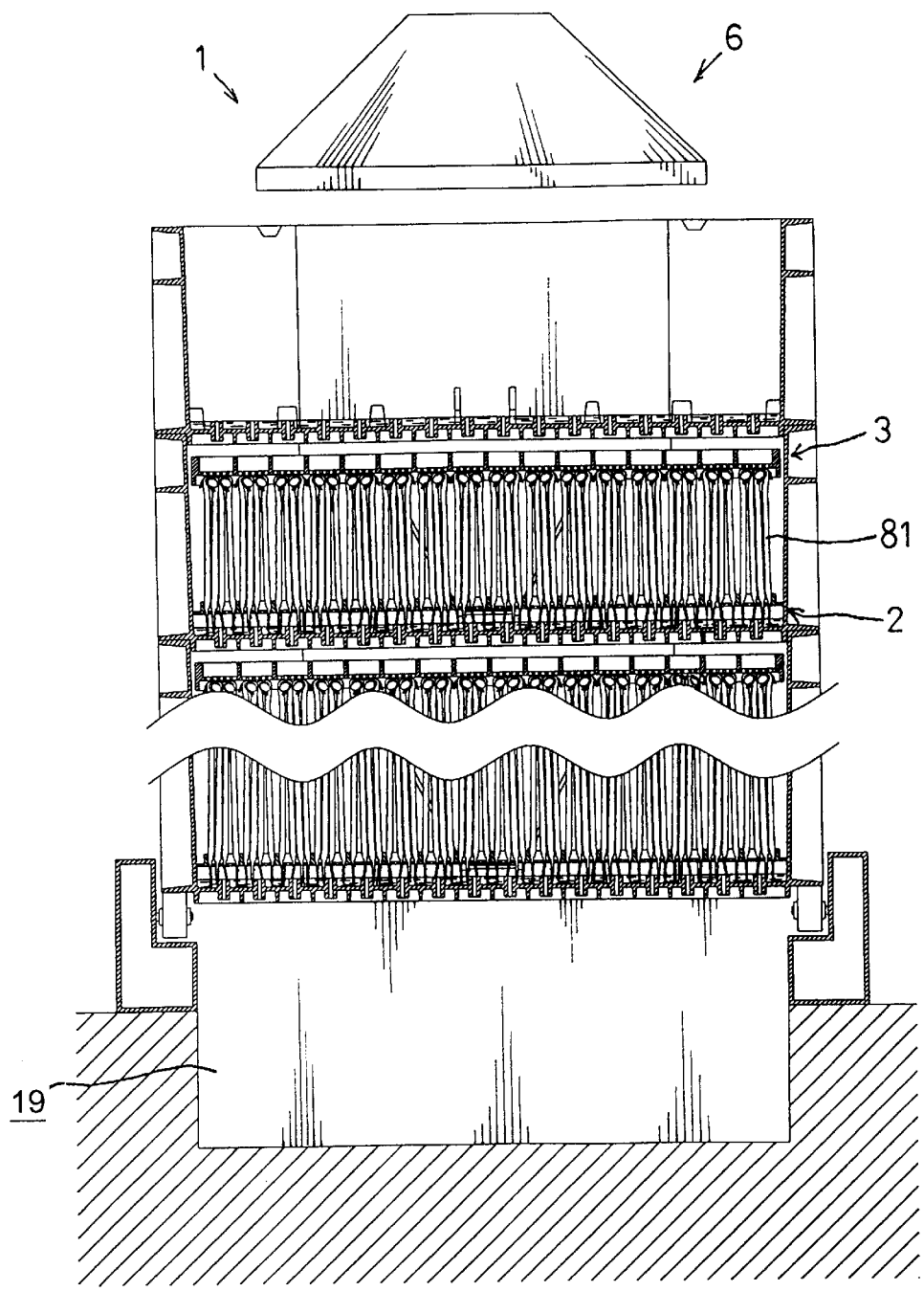
FIG. 8 is a partial schematic view showing ripened bean sprouts.

An engaging and disengaging means 5 (FIG. 2) serves to engage and disengage the elastic belt 4. The engaging and disengaging means 5 has a control rod 51 and a forked plate 52. The forked plate 52 has two legs 55 each having a positioning groove 53 and a releasing arc portion 54. The groove 53 serves to resist against the belt 4 when it is buckled to the retaining seat 33 of the pressure cover 3, as illustrated in FIGS. 3a and 3b. Thereby, the belt 4 can slide into the hooks 13 to be secured. The engaging and disengaging means 5 may be automated.

A water feeding system 6 serves to supply water into an uppermost one of the cultivation boxes 1.

With reference to FIGS. 5, 5a, 6, 6a, 7, 7a and 8, when the water flow of the water source 7 from the water feeding system 6 is greater than the total flow of the conduits 15 at the bottom of the cultivation box 1, a downward water pressure is generated so that water is guided to the water inlet 16. Then water in the downward protruding water dropping openings 17 flows uniformly into the lower cultivation box 1. The water then flows through the water dispatching holes 32 in the pressure cover 3 so that the water can more uniformly drop to the bean sprouts 81 in the lattice disk 2. The surplus water will flow into the lower cultivation box 1 from water dropping openings 17 of the conduits 15. After water has been supplied, the water inlets 16 installed in the conduits 15 will sustain water at a predetermined level to be absorbed by the roots of the bean sprouts 81. When water has reached the cultivation box 1 of the lowest layer, the surplus water will drain to the lower water exhausting groove 19 from the water dropping openings 17 of the conduits 15.

In the growth process of the bean sprouts 81, in the present invention, the hooks 13 at the lower sides of the two inner walls of the cultivation box 1 and the retaining seat 33 at the two lateral walls of the position block 14 are provided with an elastic pressure adjusting structure formed by the belt 4. From initiation to the final growth time of the bean sprouts 81, a gradually increasing elastic pressure coefficient, which is derived from a calculation, is applied (at initiation, 250 grams of bean seeds under a pressure of 1.5 kg, and at the final time, 250 grams of bean seeds under a pressure of 15 kg). Under this gradually increasing pressure, the bean sprouts will release a larger amount of ethylene gas so that the bean sprouts will grow uniformly and rapidly. The longitudinal growth of the cells of the bean sprouts 81 will be effectively suppressed, and the transverse expansion of the cells is increased. Moreover, since the bean sprouts 81 are pressed by a continuously increasing force, a larger amount of ethylene gas metabolizes into ethylene monooxygenase and then converts into ethylene oxide. Ethylene oxide is helpful to suppress the growth and breeding of bacteria in the growth of bean sprouts. Therefore, a cultivating process with no additives is achieved.

Figure 9A:
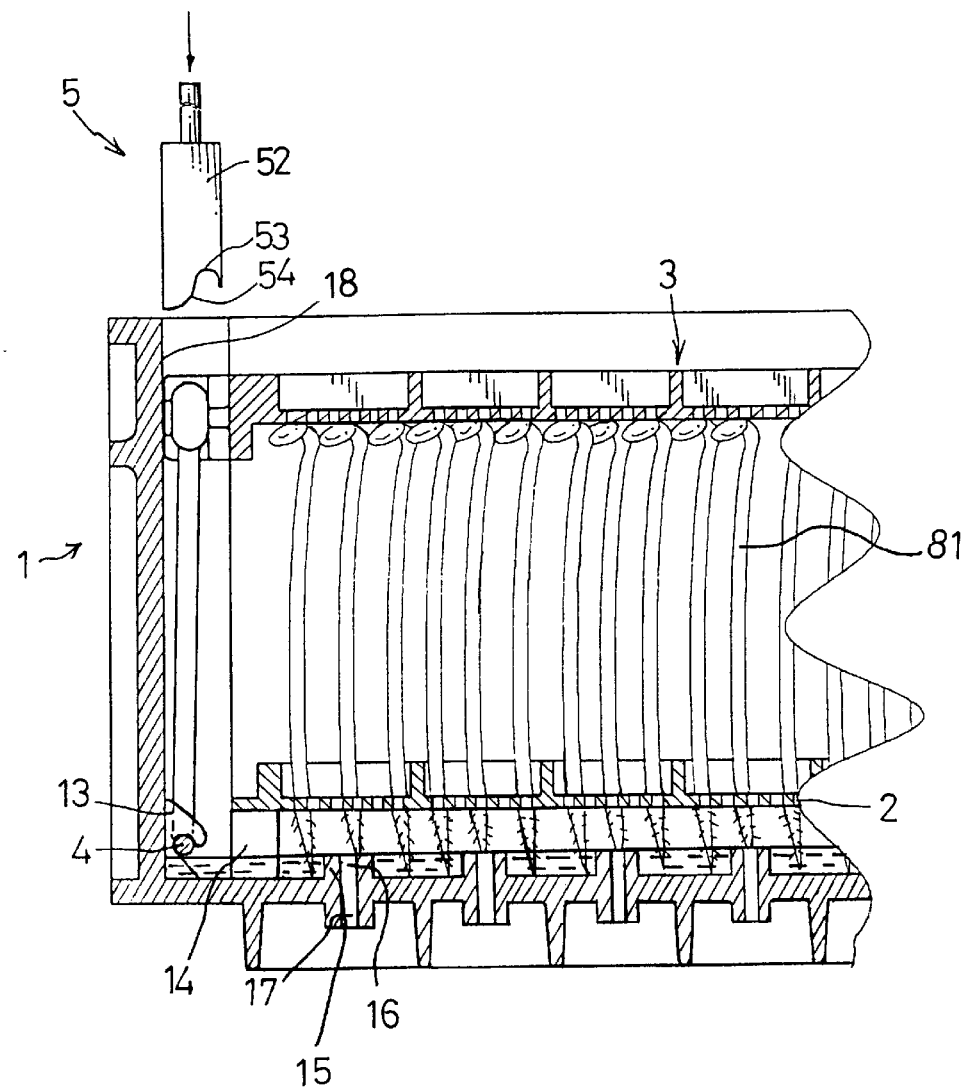
FIG. 9a shows the engaging and disengaging means disengaged.
Figure 9B:
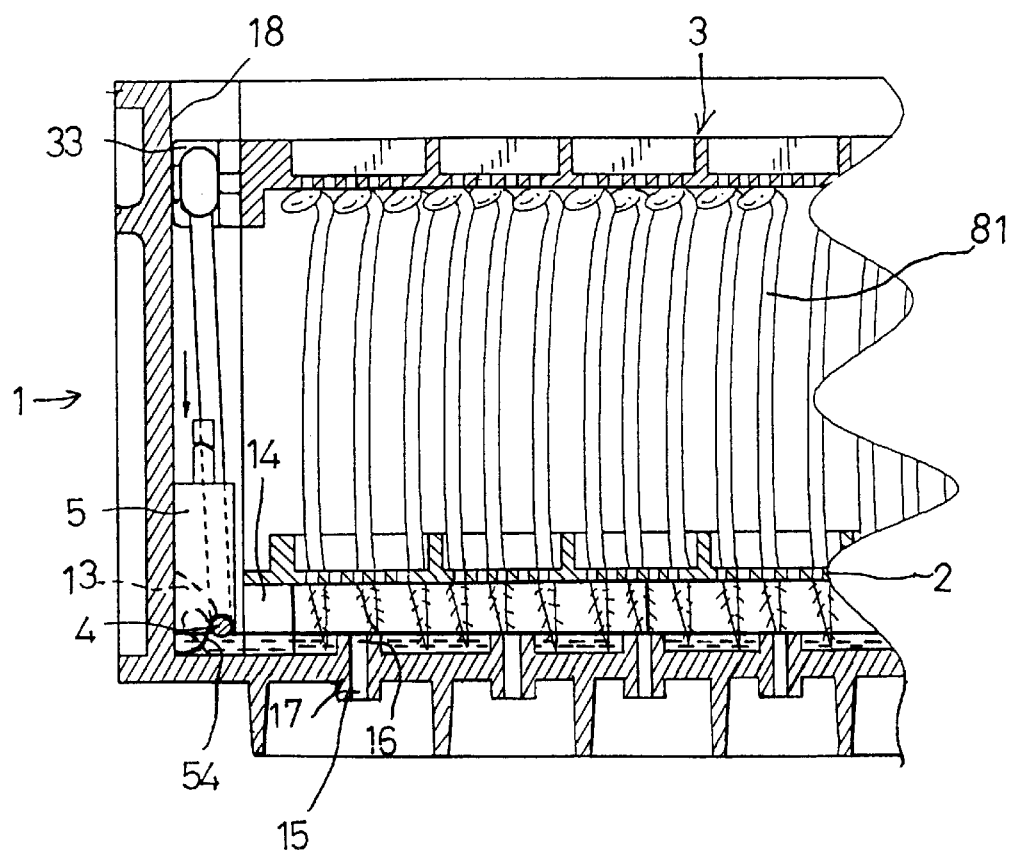
FIG. 9b shows the engaging and disengaging means engaged and the belt separated.

When the bean sprouts 81 grow to a predetermined height, the engaging and disengaging means 5 will rotate through 180 degrees. In the process of lowering the engaging and disengaging means 5, the arc portion 54 will be released to contact the belt 4, as shown in FIG. 9a. Then, due to the special design of the arc portion 54, the belt 4 will separate from the hooks 13, as shown in FIG. 9b. Therefore, the process of separation of the cultivation box 1 is complete.

Figure 10:
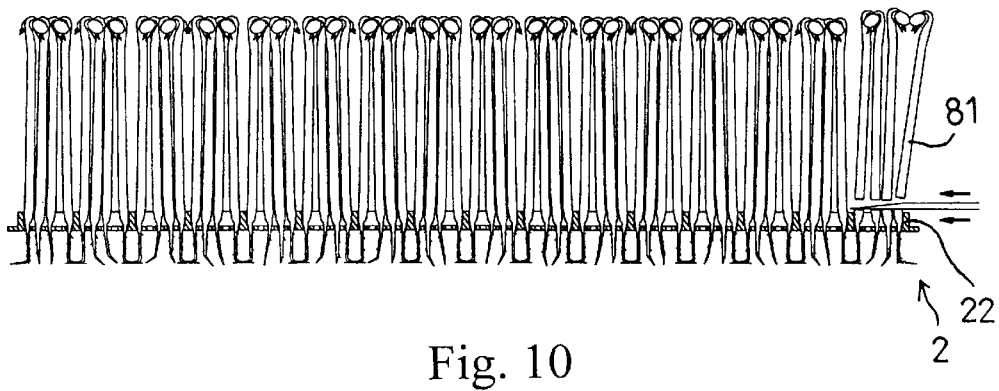
FIG. 10 is a schematic view showing the root of the bean sprouts being cut after the bean sprouts are ripe.

With reference to FIG. 10, in picking the bean sprouts 81, with the lattice frame 22 of the lattice disk 2, the bean sprouts 81 can be cut easily to separate them from the roots.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A bean sprout cultivating system that sprays water uniformly and adjusts pressure applied on the bean sprouts, comprising:

a plurality of stacking cultivation boxes, each said cultivation box comprising a plurality of positioning grooves on one surface, and plurality of positioning on a second surface, said positioning pins being received in said positioning grooves so as to position said cultivation boxes when they are stacked, an interior of each said cultivation box comprising a plurality of blocks of equal height, and a pair of opposing interior sides of said cultivation box having recesses, with hooks provided in a lower edge of each recess for hooking an elastic belt;

a pressure cover formed from ribs arranged in a lattice formation, a bottom side of said pressure cover has a plurality of water dispatching holes for dispatching water uniformly, said pressure cover further having a retaining seat at a lateral side at a position corresponding to that of said recesses of said cultivation box, said retaining seat retaining an elastic belt;

a lattice disk adapted for bedding bean seeds, a bottom thereof being formed as a flat porous bedding net which is arranged to coincide with said lattice formation of said pressure cover, the height of the lattice disk of a bedding net being established to define a height of expanding bean seeds being cultivated;

an engaging and disengaging means for engaging and disengaging said elastic belt, said engaging and disengaging means having control rod and a forked plate, said forked plate having two lags each having a positioning groove and a releasing arc portion; and a water feeding system for supplying water into an uppermost one of said cultivation boxes; wherein a bottom of each said cultivation box has a plurality of conduits, each said conduit comprising an upper end with a water inlet and a lower end with water dropping opening, so that when the water flow of said water source from said water feeding system is greater than the total flow of said conduits at a bottom of said cultivation box, a downward water pressure is created so that water flows into said water inlet, and then through said water dropping openings and uniformly into a lower cultivation box, said water then flowing through said water dispatching holes in said pressure cover to more uniformly drop to the bean sprouts in said lattice disk, and surplus water will flow into said lower cultivation box from said water dropping openings of said conduits, and after water has been supplied, said water inlets in the conduits will sustain water at a predetermined level so that the water is absorbed by roots of the bean sprouts and when water has reached the lowermost cultivation box, surplus water will drain to a lower water exhausting groove from said water dropping openings of said conduits, from which the water is drained or reprocessed for further use.

2. The bean sprout cultivating system claimed in claim 1, wherein:

said retaining seat is at least partially covered by a protecting piece.

3. The bean sprout cultivating system as claimed in claim 1, wherein:

said elastic belt is made of rubber.

4. The bean sprout cultivating system as claimed in claim 1, wherein:

said elastic belt is in the form of a spring.

\* \* \* \* \*